(12) United States Patent
Liu et al.

(10) Patent No.: US 6,711,282 B1
(45) Date of Patent: Mar. 23, 2004

(54) METHOD FOR AUTOMATICALLY SEGMENTING A TARGET BONE FROM A DIGITAL IMAGE

(75) Inventors: Brent J. Liu, Los Angeles, CA (US); Hyeonjoon Shim, Los Angeles, CA (US); David Edelstein, Manhattan Beach, CA (US); Eric Duff, San Diego, CA (US); Xiaoli Bi, Cerritos, CA (US)

(73) Assignee: Compumed, Inc., Los Angeles, CA (US)

( * ) Notice: Subject to any disclaimer, the term of this patent is extended or adjusted under 35 U.S.C. 154(b) by 0 days.

(21) Appl. No.: 09/430,054

(22) Filed: Oct. 29, 1999

(51) Int. Cl.[7] .......................... G06K 9/00; G01N 23/06
(52) U.S. Cl. ........................................ 382/132; 378/54
(58) Field of Search ......................................... 382/132

(56) References Cited

U.S. PATENT DOCUMENTS

| | | | |
|---|---|---|---|
| 4,721,112 A | * 1/1988 | Hirano et al. ................. 378/53 |
| 5,291,537 A | 3/1994 | Mazess ......................... 378/54 |
| 5,335,260 A | 8/1994 | Arnold ........................ 378/207 |
| 5,365,564 A | 11/1994 | Yashida et al. ................ 378/55 |
| 5,426,709 A | * 6/1995 | Yoshida et al. .............. 348/243 |
| 5,533,084 A | 7/1996 | Mazess ......................... 378/54 |
| 5,574,803 A | 11/1996 | Gaborski et al. ............ 382/259 |
| 5,673,298 A | 9/1997 | Mazess ......................... 378/54 |
| 5,696,805 A | * 12/1997 | Gaborski et al. ............. 378/54 |
| 5,712,892 A | 1/1998 | Weil et al. |
| 5,852,647 A | 12/1998 | Schick et al. ................. 378/53 |
| 5,898,753 A | 4/1999 | Schick et al. ................. 378/54 |
| 5,910,972 A | 6/1999 | Ohkubo et al. ............... 378/54 |

OTHER PUBLICATIONS

Brent J. Lui, Ricky K. taira, HyeonJoon Shim, Patricia keaton, "Automatic Segmentation of bones from digital hand radiographs," SPIE vol. 2434 0–8194–1782–3/95, pp. 659–669.*

Hyeonjoon Shim, Brent J. Liu, Ricky K. Taira, Theodore Hall, "Object–oriented approach towards the automatic segmentation of bones from pediatric hand radiographs," SPIE vol. 3034 0277–786X/97, pp. 95–105.

Brent J. Liu, Ricky K. Taira, HyeonJoon Shim, Patricia Keaton, "Automatic Segmentation of bones from digital hand radiographs," SPIE vol. 2434 0–8194–1782–3/95, pp. 659–669.

* cited by examiner

Primary Examiner—Leo Boudreau
Assistant Examiner—Hussein Akhavannik
(74) Attorney, Agent, or Firm—Eric Ho

(57) ABSTRACT

An automatic segmentation module with an open architecture that automatically generates a contour of a target bone based on a digital image. In one embodiment, the digital image can include an extremity, such as a hand with three digits and a calibration wedge. The automatic segmentation module receives the digital image as an input, and automatically segments the target bone by utilizing an object-oriented approach. This approach extracts intermediate target objects and uses these intermediate target objects to refine or limit the search space in order to extract the final target object.

19 Claims, 12 Drawing Sheets

METHOD FOR AUTOMATICALLY SEGMENTING A TARGET BONE FROM A DIGITAL IMAGE

BACKGROUND OF THE INVENTION

1. Field of the Invention

The present invention relates generally to image processing and specifically to a method for automatically generating a contour of a target bone based from a digital image.

2. Background of the Invention

Osteoporosis is a bone disease characterized by low bone mass and microarchitectural deterioration of bone tissue. This disease subjects a person to enhanced bone fragility and a consequent increase in fracture risk, particularly in the spine, hip and wrist. Osteoporosis is particularly common in postmenopausal women because their bone loss greatly exceeds that of men at this age. It has been estimated that at least 28 million Americans, 80% of whom are women, have a lower than normal bone mass and are at risk of having osteoporosis. In the United States alone, 10 million people already have osteoporosis and many women die each year from complications due to osteoporosis.

The assignee of the present invention has developed a proprietary bone density measurement system called Osteo-Gram Analysis. The OsteoGram Analysis system involves taking a standard X-ray of three fingers, along with a calibration wedge in the field of view by using existing and widely available standard X-ray equipment. The calibration wedge is utilized to adjust for differences among X-ray equipment, exposures, types of film, and the development process. The assignee of the present invention has a central specialized laboratory that receives these x-rays and provides a service to medical professionals of providing a bone mineral density (BMD) report based on the x-ray.

Although this service provides accurate reports, there has been a demand for an on-site solution that can be utilized by physicians or other medical professionals locally at their offices to generate the BMD report based on hand x-rays.

An important step is generating a contour of a target bone which is then used to calculate BMD. The lab service, described above, uses trained technicians to draw and identify the contour. Unfortunately, this approach to determining the contour of the bone requires and is dependent on the skill and training received by the technicians who administer this task. This approach involves cost, complexity, and training time which is not amendable to an on-site solution.

An alternative approach is to generate the contour of bone by employing some type of automatic contour extraction software program. An example of such an approach is described in U.S. Pat. No. 5,696,805, which is entitled "Apparatus and Method for Identifying Specific Bone Regions in Digital X-Ray Images." Unfortunately, this approach suffers from several disadvantages.

First, the binarization approach to separate background information from desired objects, described in the '805 patent, is inadequate because there can be various inhomogeneities that exist within the actual hand image (e.g., radiographic shadow, scatter, inconsistent X-Ray field, etc.) that can render the binarization method inadequate. In many cases, a general approach is not robust enough to accurately separate the desired objects given the vast variability that exists among image acquisition and digitization.

Second, the skeletonizing technique, which is described in greater detail in U.S. Pat. No. 5,574,803, which is entitled "Character Thinning Using Emergent Behavior of Populations of Competitive Locally Independent Processes," is complex and difficult to implement, thereby adding to the development costs and time in implementing this approach.

Third, this approach uses a grayscale analysis to determine the location of joint spaces, which can be inaccurate in cases where there are fused joints or overlapping joint areas.

Fourth, this approach does not address or describe how the bottom and top bone edges are extracted, particularly in the joint space areas, which is an important step in accurately generating the contour of the bone.

Fifth, this approach does not provide an architecture or systematic approach, thereby making this approach difficult to incorporate, customize, develop, refine, or test new and different methods.

In addition, this approach does not allow for user verification of the segmentation. For example, if faulty or inaccurate segmentation in the form of errors should occur for visible reasons (e.g., severe arthritis, fused joints, bone spurs, bone calcifications, image artifacts, etc.) or invisible reasons (e.g., radiographic shadow, x-ray scatter and noise, poor contrast, etc.), then these errors can propagate through the entire system described in the '805 patent. These errors render the final output useless. Furthermore, there is no mechanism for a user to provide feedback to the program in order to improve intermediate results.

Accordingly, there remains a need for a method for automatically generating a contour of a target bone based on a digital image that departs significantly from existing methods and that overcomes the disadvantages set forth previously.

SUMMARY OF THE INVENTION

Accordingly, it is an object of the present invention to automatically generate a contour of a target bone.

It is a further object of the present invention to automatically generate a contour of a target bone and receive user input to refine the contour of the target bone.

It is yet another object of the present invention to provide an automatic segmentation module that utilizes shape analysis to determine the location of joint edge points.

It is yet another object of the present invention to provide an automatic segmentation module that utilizes candidate selection to determine the location of joint edge points.

It is yet another object of the present invention to provide an automatic segmentation module that utilizes minimum flow analysis to determine the top and bottom edges of the target bone.

It is yet another object of the present invention to provide an automatic segmentation module that has an object oriented architecture that allows for feedback verification, user intervention, and flexibility to incorporate different methods.

In accordance with the present invention, the foregoing objects are met in an automatic segmentation module with an open architecture that automatically generates a contour of a target bone based on a digital image. In one embodiment, the digital image can include an extremity, such as a hand with three digits and a calibration wedge. The automatic segmentation module receives the digital image as an input and automatically segments the target bone by utilizing an object-oriented approach. This approach extracts intermediate target objects and uses these intermediate target objects to refine or limit the search space in order to extract the final target object.

DETAILED DESCRIPTION OF THE INVENTION

Figure 1:
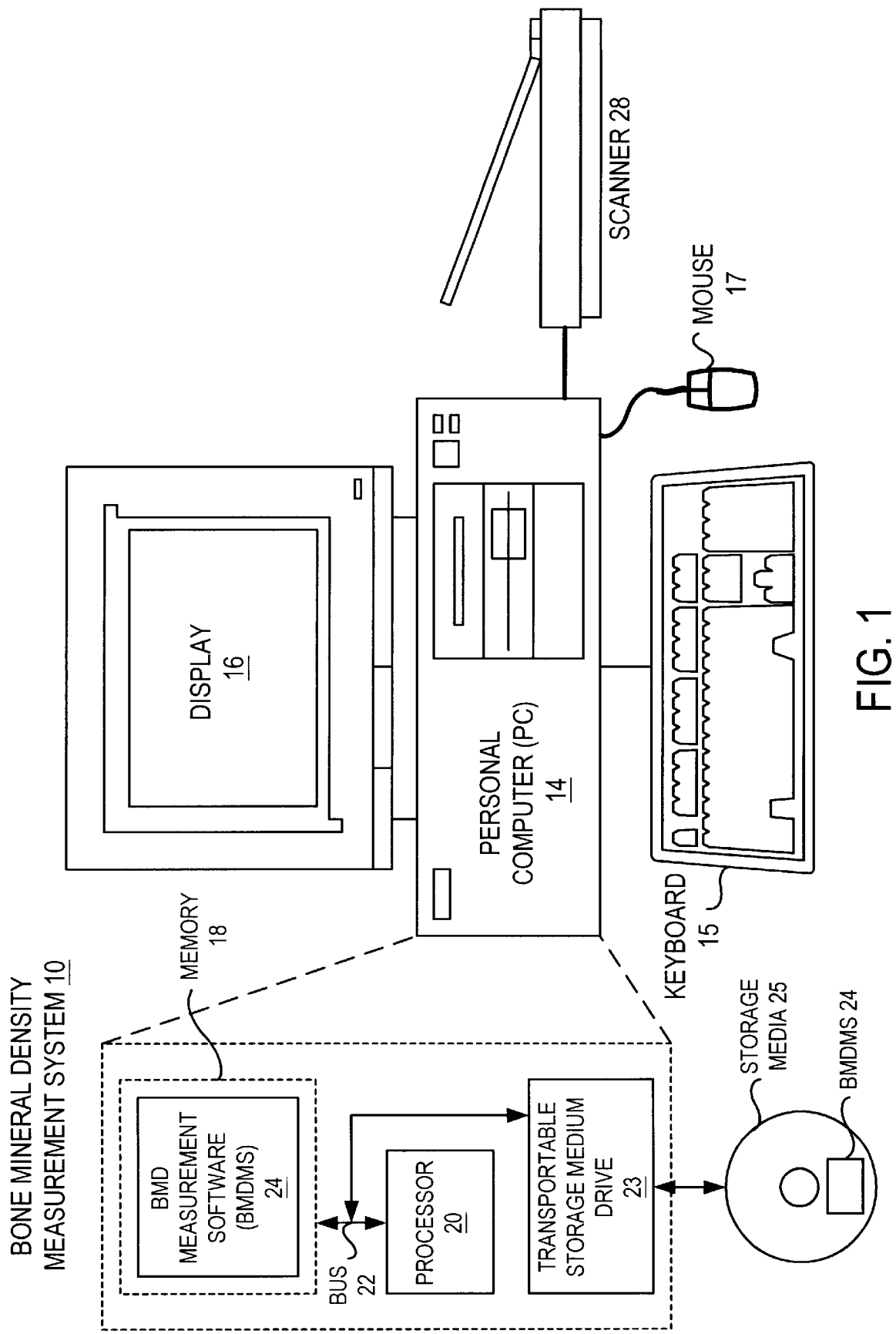
FIG. 1 is a block illustrating a bone mineral density measurement system according to the present invention.

The subject invention will be described with reference to numerous details set forth below, and the accompanying drawings will illustrate the invention. The following description and the drawings are illustrative of the invention and are not to be construed as limiting the invention. Numerous specific details are described to provide a thorough understanding of the present invention. However, in certain instances, well known or conventional details are not described in order to not unnecessarily obscure the present invention in detail. In the drawings, the same element is labeled with the same reference numeral.

The present invention provides several novel aspects. First, a bone segmentation method is described that employs an object oriented architecture that has a final target object with predetermined attributes and at least one intermediate target object that has one or more attributes. The object oriented architecture of the present invention provides the advantages of flexibility, scalability, and interoperability.

Second, a bone segmentation method is described that determines the contours of the digits and wedge by limiting the search space to a local region for each digit and wedge. By localizing the region, the segmentation results generated for each digit and wedge are improved.

Third, a bone segmentation method is described that determines the top and bottom bone edges by utilizing shape analysis. By utilizing shape analysis, the bone segmentation method of the present invention accurately extracts the top and bottom bone edges even when the bones have poor bone to soft-tissue contrast or are fused together, such as in a case of severe arthritis. In contrast, the prior art method for determining the bottom and top edges by using gray-level differences would generally fail in the situation where bones have poor bone to soft-tissue contrast or are fused together.

System 10

FIG. 1 is a block diagram illustrating a bone mineral density measurement system 10 according to the present invention. System 10 includes a personal computer (PC) 14 that is coupled to a user input device, such as a keyboard 15, for allowing a user to input information and a cursor pointing device, such as a mouse 17, for controlling mouse functions. PC 14 is also coupled to a display 16, which can be a monitor. PC 14 also has a processor 20 for executing programs that is coupled via a bus 22 to a memory 18 for storing programs, such as bone mineral density measurement software (BMDMS) 24 of the present invention. System 10 can also include a scanner 28 for scanning information, such as x-ray film, into PC 14. The PC 14 can also include a transportable storage medium drive 23 for reading from and/or writing to transportable storage media 25, such as a floppy magnetic disk or writable optical compact disk (CD). Storage media 25, which is a computer readable media, can include BMDMS 24 of the present invention.

Figure 2:
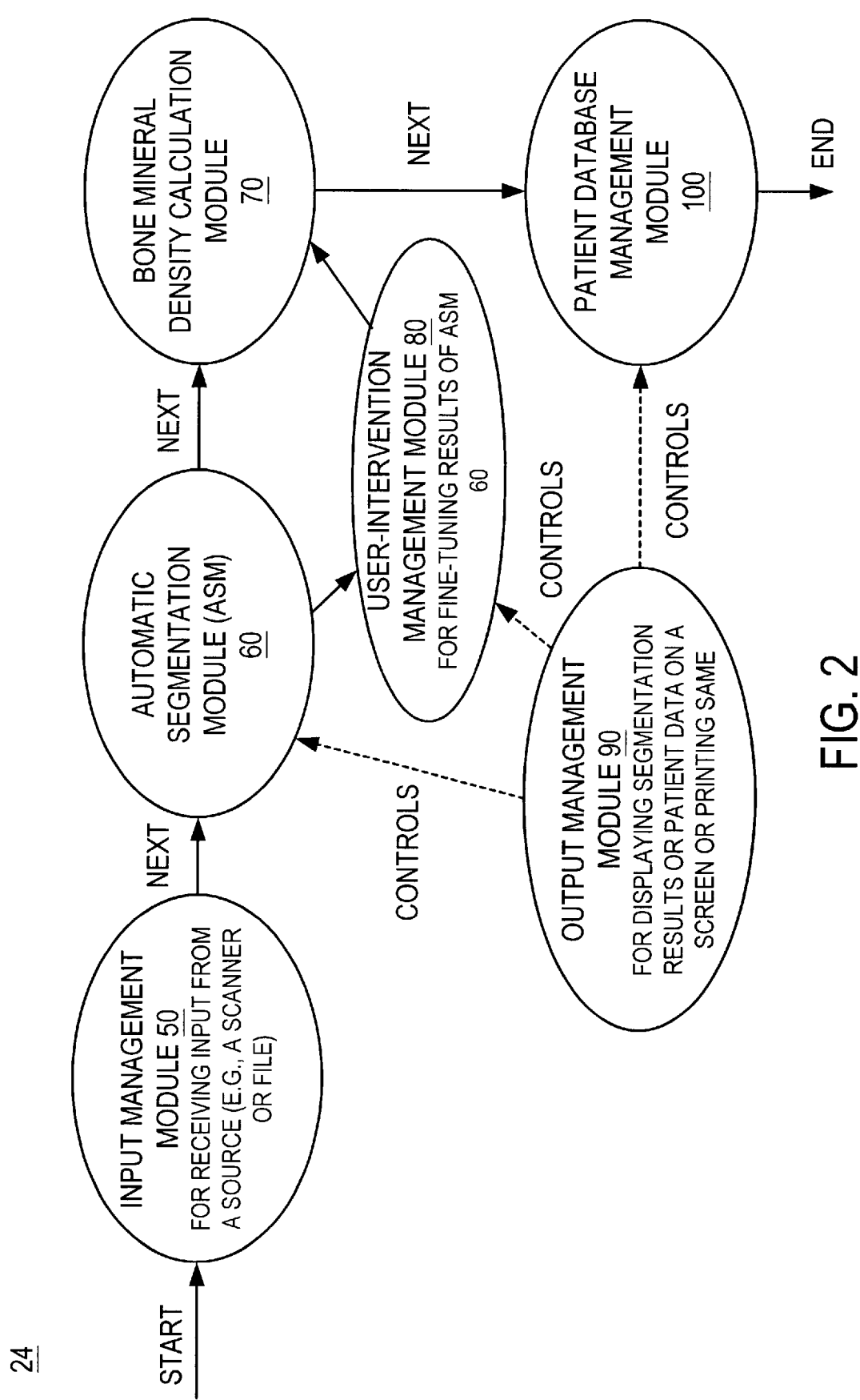
FIG. 2 is a block diagram illustrating the bone mineral density measurement software of FIG. 1.

FIG. 2 is a block diagram illustrating a bone mineral density measurement software (BMDMS) 24 in which the segmentation method of the present invention can be implemented. Bone mineral density measurement software 24 can include an input management module (IMM) 50 for receiving input from either scanner 28 or a file stored in PC 14.

Bone mineral density measurement software 24 also includes an automatic segmentation module 60 for automatically generating a contour of a predetermined bone. Automatic segmentation module (ASM) 60 can be configured in accordance with the teachings of the present invention and is described in greater detail hereinafter with reference to FIG. 4.

Bone mineral density measurement software 24 also includes a bone mineral density calculation module (BMDCM) 70 for receiving the contour provided by ASM 60 and based thereon for generating bone mineral density measurement analysis and report, which can be utilized to access a patient's risk of osteoporosis.

Bone mineral density (BMD) measurement software 24 utilizes certain techniques to calculate the bone mineral density based on the contour of a bone.

Bone mineral density measurement software 24 can also include a user intervention management module (UIMM) 80 for allowing a user to provide additional information to fine-tune or otherwise refine the contour provided by the automatic segmentation module.

Bone mineral density measurement software 24 also can include an output management module (OMM) 90 for displaying segmentation results, displaying patient data on the screen, or allowing the user to print hard copies of these results.

Bone mineral density measurement software 24 also can include a patient database management module (PDMM) 100 for allowing a user to selectively store the BMD measurement analysis and report in a database, such as a Microsoft Access database available from Microsoft Corporation of Redmond, Wash. PDMM 100 allows for a care provider to readily access BMD measurement analysis and report from previous tests to access the effectiveness of treatment and also monitor progress or change of a patient's BMD over time.

Further details concerning particular embodiments of a system in which the automatic segmentation method of the present invention can be implemented may be found in U.S. Pat. No. 6,246,745 entitled, "Method and Apparatus for Determining Bone Mineral Density" by inventors Xiaoli Bi, David Edelstein, Brent J. Liu and Louai Al-Dayeh, which is incorporated herein reference.

General Segmentation Architecture of the Present Invention

The image processing segmentation architecture of the present invention uses concepts extracted from three areas of computer science: 1) object-oriented design, 2) knowledge-base engineering, 3) database management. Specifically, the system architecture is based on object-oriented design techniques tailored with knowledge-based engineering. The data output is structured and organized using object-oriented database techniques. Because of its modularity, it can be easily implemented into a larger system. The methods and algorithms used in the modules are assisted by a knowledge base. Records for each target object, which varies from small objects to large objects, simple to complex, are stored in the knowledge base. These records contain information specific to each of the objects. Once these methods are executed to extract the target object, the result data can be either stored in the main system's database, stored in the segmentation module for aid in extracting other target objects, or displayed if so chosen by a system call.

The concepts described are very applicable to image segmentation when the desired output are target objects that are well characterized and defined. By using this system architecture based on an object-oriented approach, all information and data can be organized in an orderly, concise manner. If an image is broken down into smaller, more detailed objects, the complexity of the task also becomes much more manageable. For this segmentation module, the goal was to break down the segmentation object, the middle phalange of digits 2,3, and 4, into more intermediate objects each with specific applications or custom methods applied only to that desired intermediate object. These intermediate target objects and their methods and attributes will be described further.

Two things can be attached to each intermediate object. The first thing that can be attached to each target object are attributes or characteristics of that specific object. These characteristics (e.g., gray-level values) can be similar in two different objects. However, what distinguishes one object from another is the total sum of attributes attached to the object.

The second thing that can be attached to the object are methods, techniques, and applications that are used to obtain either the attributes of the target object or other objects. These methods may include standard image processing techniques (e.g., edge-detection methods and noise smoothing methods) or custom techniques that are used for specific cases. Furthermore, these techniques can be shared by any level of target objects (from the most general to the most detailed).

The system architecture of the present invention has several advantages over prior art segmentation systems. First, the object-oriented system architecture provides for the easy insertion of new future methods since all target objects have well-defined interfaces, and the new methods do not affect other intermediate target objects. Second, not only is the segmentation approach object-oriented, but the source code takes advantage of this architecture by implementing the segmentation module in object-oriented software language, such as C++. The use of an object-oriented software language allows for code reuse without the need to develop whole parts of the source code every time a new instance type of image is introduced.

In fact, improved characterization and segmentation of intermediate target objects only improve the overall result without having to change large portions of code to accommodate the new, improved results. This provides for easy "plug and play of methods" and allows for faster research and development of further techniques.

For example, a current method for extracting the digit contours of the hand image has been developed. If a new method is developed to extract the digit contour, the code can be easily implemented in the source code since it is implemented in object-oriented C++ code. This new method can then be called from a top level application and then tested. If the new method has better results than the current method then the old method can either be removed or just never used. If the new method in turn does not improve performance, then the old code can be called once again and the new method can be either discarded or not used. With better results of the digit contour extraction, it will help further to determine the digit axis and so on.

Another example of the advantages of object-oriented approach and object-oriented C++ code in terms of expansion is the ability to derive a new class from the current class. For example, using the object-oriented segmentation approach, a hand image class is developed to specifically extract the middle phalange contour. This hand image is composed of three digits and a wedge located on the right side of the image. However, a new hand image is introduced in which the middle phalange contour is the final target object as well. This hand image is different from the previous hand image since it is an image of an entire hand. With object-oriented C++ code, a new class can be derived from the current hand image where current methods are shared and new methods can be developed. These new methods would be to extract the entire hand and then break down the hand into the three digit contours. Once the extraction reaches the digit contour level then the current methods can be used without rewriting new code. The same methods to extract the middle phalange from the digit contour in the current method can be used by the new hand image class because it is derived from the original class. Furthermore, the original hand image class will never know about the new methods and rightly so, since there is no need for the original hand image class to extract an entire hand image contour.

Because of the object-oriented design, communication between different objects can be easily defined and executed. Therefore, in this segmentation an interface has been developed to allow for communication of results and attributes from target objects of different intermediate levels. Furthermore, the system also provides for verification of objects at each intermediate level. Checkpoints are defined and a feedback loop can be designed to implement the verification of intermediate target objects as well as improving the intermediate results. This will not only improve the overall segmentation results but may also provide a "semi-automatic" mode described in further detail in the next point.

For example, in the hand image class of the segmentation system the method to extract the digit contour has been called from a higher application. Once this method has been performed the result data is stored within the class. Therefore another method can be developed to verify the current result data. Within this verification method, not only will the results be verified but also the localization of error and custom methods can be introduced to improve the current results. In the higher application, the method to extract the digit contour can be called first. Then the verification method can be called directly after to verify the results. These two methods can then be called in a loop until the results fulfill an arbitrary success level or until all knowledge has been exhausted and an accurate result cannot be attained. Similar to replacing a current method with a new method, the verification method can be easily implemented later without having to rewrite large portions of source code. With the improved results from the verification method, they will only improve further target objects.

With the aid of the feedback loop, the system, upon exhausting all knowledge and methods to extract the target object, can switch to a "semi-automatic" mode where the system will expect attributes and characterizations provided by a user. Furthermore, due to the object-oriented design, an interface can easily be developed to allow the user to initiate the semi-automatic mode and provide better attributes and characterization for the system.

For example, if the verification loop does not produce satisfactory results or if the operator is not satisfied with the automatic results, then the operator can define the features for the segmentation system. Because the segmentation approach is object-oriented and organized in a hierarchy from general to specific, the goal of the semi-automatic mode is to choose the feature that will produce the most accurate results. These features most likely are the hardest to extract automatically by the system and are usually features associated with the most complex intermediate target object. Once this feature is identified by the operator, it can be entered into a new method that expects the input data. This method is then called by a higher application. Because of the object-oriented design and implementation this method will reuse the same methods the system would have performed automatically. This saves time and effort in implementation since methods used by the automatic segmentation are the same methods used in the semi-automatic mode. The only difference being that an operator defines the features instead of having the system extract and define them.

With the flexibility provided by the system architecture of the present invention, a segmentation module can be developed rapidly while allowing for further improvements to be easily integrated. Furthermore, it provides an to allow feedback verification of intermediate objects and semi automatic operator intervention if necessary.

Segmentation Architecture for the Middle Phalange (MP)

The goal is to break down the target object (e.g., the middle phalange of digits 2, 3, and 4) into intermediate objects each with specific applications or custom methods associated with obtaining the intermediate object. Examples of these intermediate target objects and their methods and attributes are described in greater detail hereinafter.

Two things can be attached to each intermediate object. The first thing that can be attached to each target object are attributes or characteristics of that specific object. These characteristics (e.g., gray-level values) can be similar in two different objects. However, what distinguishes one object from another is the total sum of attributes attached to the object.

The second thing that can be attached to the object are methods, techniques, and applications that are used to obtain either the attributes of the target object or other objects. These methods may include standard image processing techniques (e.g., edge-detection methods and noise smoothing methods) or custom techniques that are designed to suit a particular application. Furthermore, these techniques can be shared by any level of target objects (from the most general to the most detailed).

The segmentation architecture of the present invention has several advantages over prior art segmentation systems. First, the object-oriented system architecture is open and provides for the easy insertion of new future methods since all target objects have well-defined interfaces, and the new methods do not affect other intermediate target objects. Second, not only is the segmentation approach object-oriented, but the source code takes advantage of this architecture by implementing the segmentation module in object-oriented software language, such as C++. The use of an object-oriented software language allows for code reuse without the need to develop whole parts of the source code every time a new instance type of image is introduced.

Accordingly, improved characterization and segmentation of intermediate target objects serve to improve the performance of the present invention without having to re-write large portions of code to accommodate the new, improved results. The segmentation architecture of the present invention also provides for easy "plug-and-play" of methods and allows for faster research and development of further techniques.

For example, a current method for extracting the digit contours of the hand image has been developed. If a new method is developed to extract the digit contour, the code can be easily implemented in the source code since it is implemented in object-oriented C++ code. This new method can then be called from a top level application and then tested. If the new method has better results than the current method, then the old method can either be removed or just never used. If the new method in turn does not improve performance, then the old code can be called once again, and the new method can be either discarded or not used. The advantage of an improved result at an intermediate stage or object is that the other intermediate stages generate better results because these subsequent stages use the improved result. For example, when a digit contour extraction object is improved, the improved digit contour leads to an improved digit axis.

Stages for the Segmentation of the Middle Phalange

Figure 3:
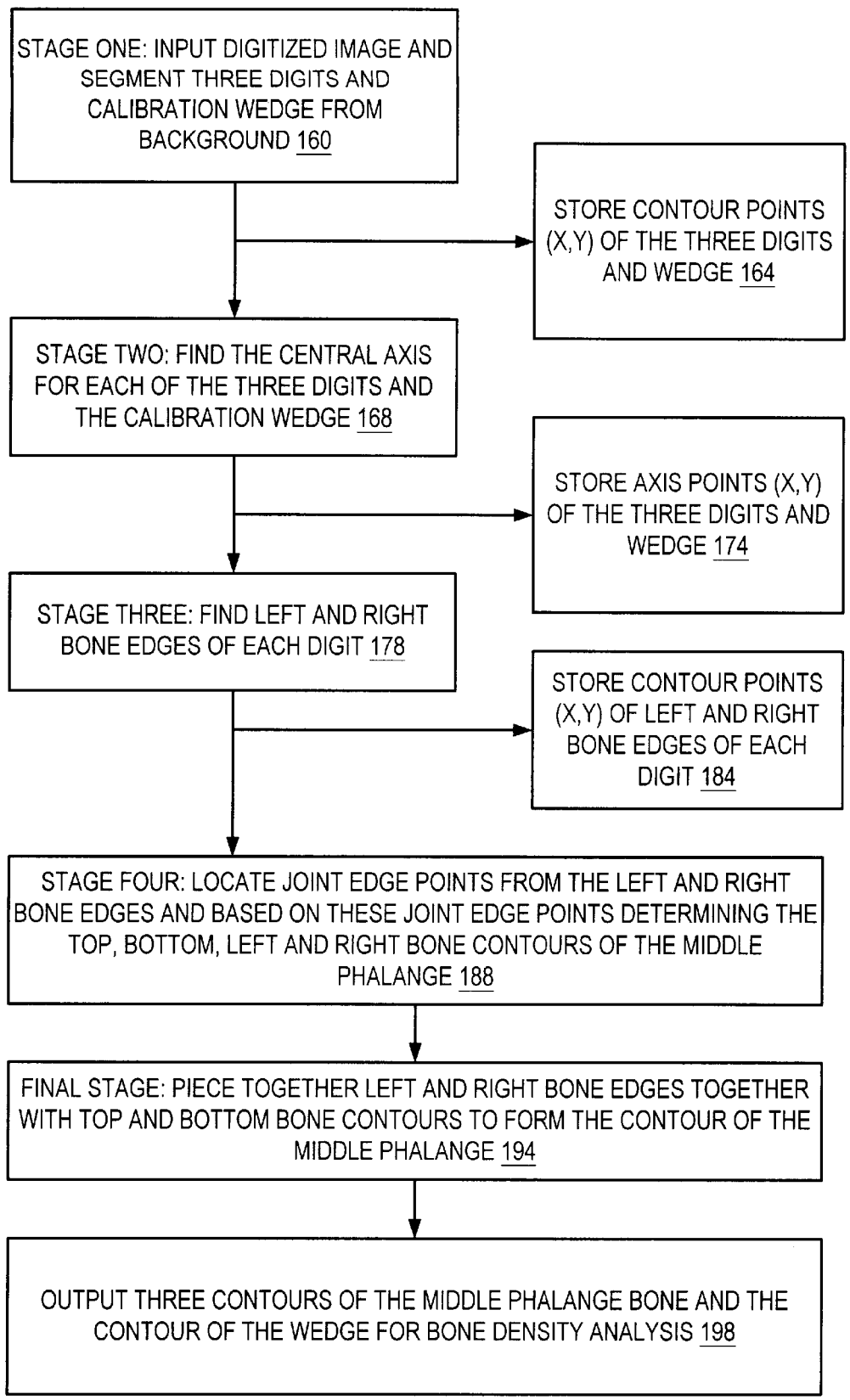
FIG. 3 is a flowchart illustrating the steps of automatically segmenting a target bone according to one embodiment of the present invention.

FIG. 3 is a flowchart illustrating the steps of automatically segmenting a target bone (e.g., the middle phalange) according to one embodiment of the present invention. The processing is divided into five stages where each stage is focused on a target object. Accordingly, the present invention has the advantage of having flexibility, scalability, and interoperability. Each stage can be written as a self contained module in an object-oriented fashion so that the interface between the stages is well-defined even when the methods implemented by a stage are different, updated or otherwise improved (i.e., a change in the method of any of the stages does not disrupt the flow or operation of the present invention or require re-programming of the entire program, but only the affected module).

Figure 5:
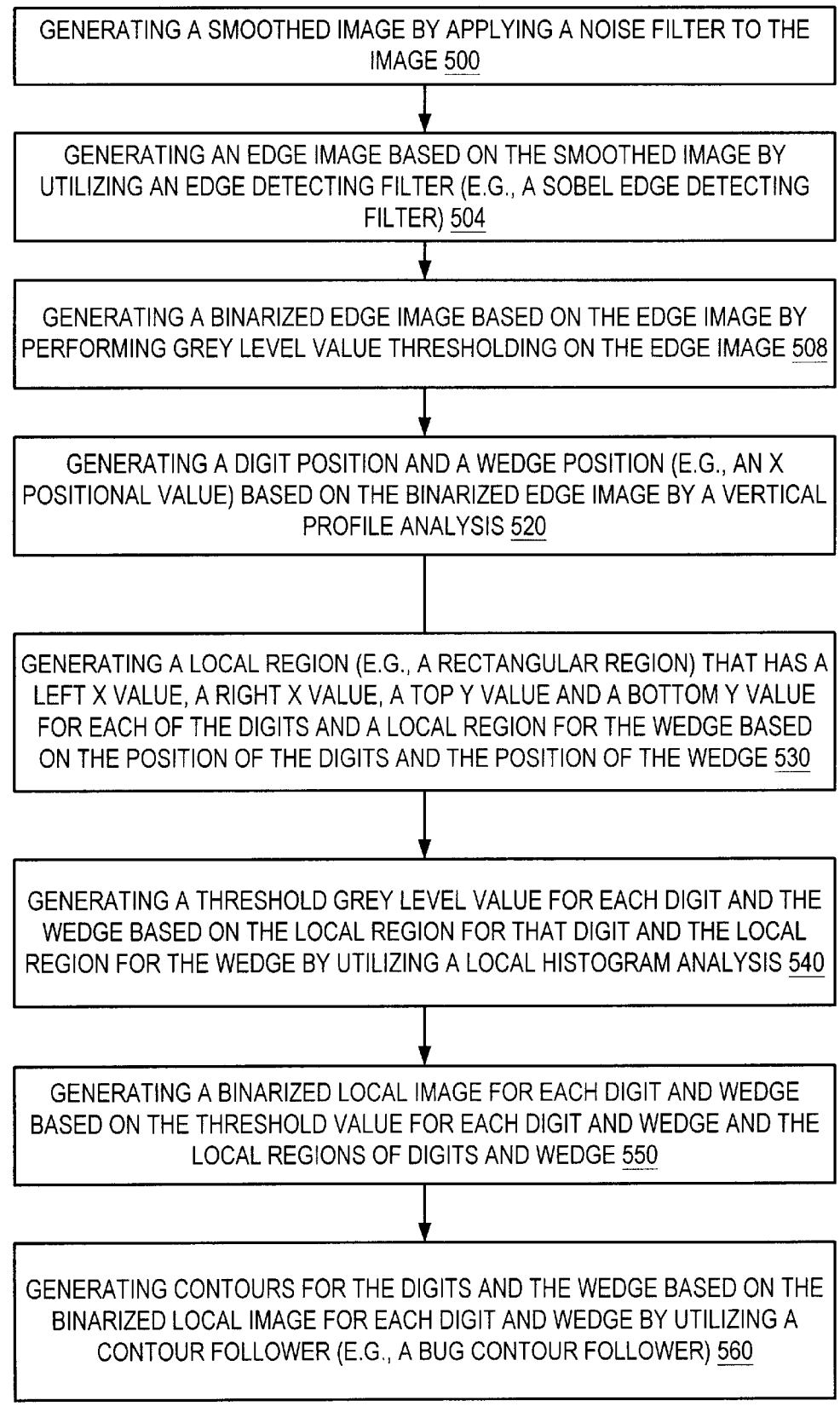
FIG. 5 is a flowchart illustrating in greater detail the step of determining the contour of the digits and the calibration wedge of FIG. 4 according to one embodiment of the present invention.

In processing step 160, the three digits and the calibration wedge are segmented from the background. FIG. 5 illustrates in greater detail how processing step 160 can be implemented in accordance with one embodiment of the present invention. In processing step 164, the contour points (x,y) of the three digits and wedge are stored.

Figure 9:
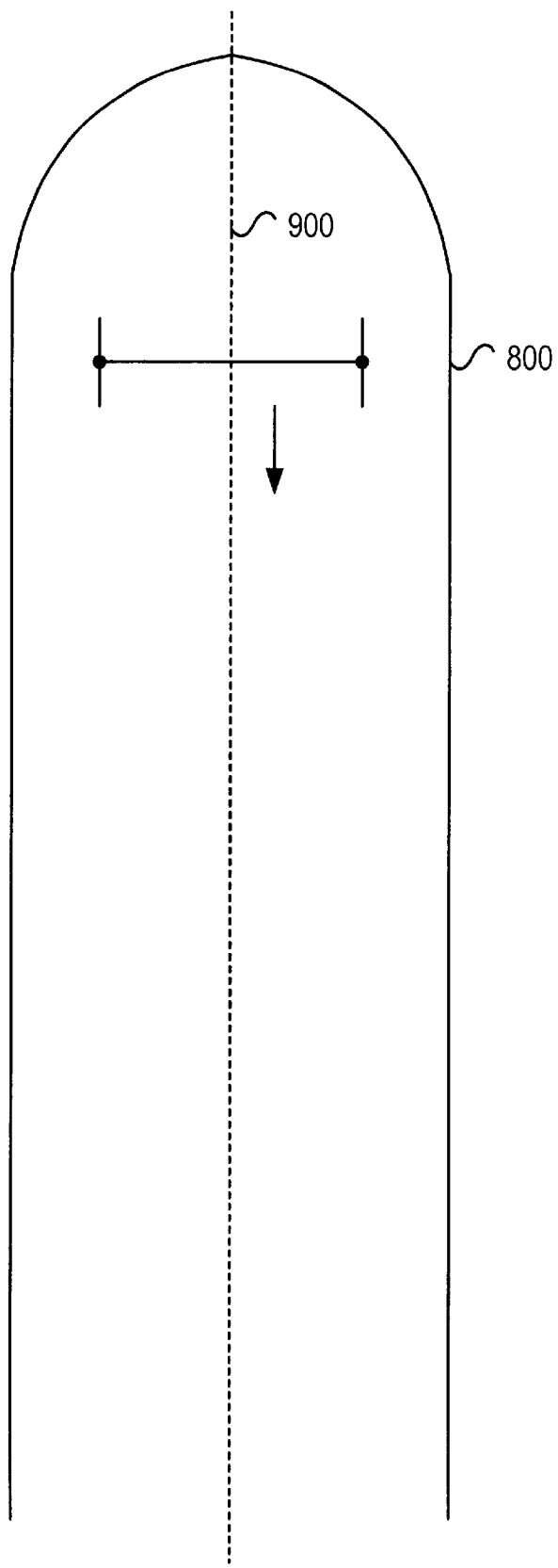
FIG. 9 illustrates an exemplary medial axis of a digit generated by the present invention.

In processing step 168, the central axis (also referred to herein as a medial axis) of each of the three digits and the wedge is determined. An example of the medial axis is medial axis 900 shown in FIG. 9. The main attribute or characteristic for extracting the digit axis points is the fact that points of the medial axis of the phalanges are located near the points of the medial axis of the digit. Accordingly, once the medial axis of the digit contour is determined, it can be used for the medial axis of the phalanges. Determining the medial axis of the phalanges is important for the extraction of the bone edges of the phalanges. A second attribute is that the digit contour region is longitudinal in shape, and the medial axis can be determined from this shape/region.

It is interesting to note, however, that the first digit (i.e., the thumb) does not adhere to this characteristic. In the future, if it is necessary to determine the medial axis for the phalanges of a thumb, the segmentation architecture of the present invention allows a different method to be used for extracting the thumb's medial axis while continuing to maintain a similar interface as the other digits.

In one embodiment, the following steps are performed for determining the medial axis for each digit and wedge. First, a center of mass is calculated based on the data points of the digit contour. The center of mass is used to anchor a line that is drawn for the medial axis. Next, a second momentum is calculated based on the data points of the digit contour. The second momentum represents a tilt angle measured from a horizontal plane for each digit and wedge. By using the center of mass and the tilt angle, the medial axis is determined by drawing a line from the top of the digit contour to the bottom of the digit contour.

In processing step 174, the axis points (x,y) of the three digits are stored. In processing step 178, the left bone edge and the right bone edge of each digit are determined. In processing step 184, the contour points (x,y) of the left and right bone edges of each digit are stored.

In processing step 188, the joint edge points are located from the left and right bone edges. These points are used to localize the joint space area and serve as anchor points for determining the contours of the joint space areas for the top and bottom of the middle phalange. These contours are the top and bottom edges of the target bone. In processing step 194, the left and right bone edges are pieced together with the top and bottom bone contours to form the contour of the middle phalange. In processing step 198, the three contours of the middle phalange bone and the contour of the wedge are provided for bone density analysis.

As stated before, the segmentation system proceeds through intermediate target objects which can also be called stages. A stage is determined based on the target object of segmentation and can be considered completed when the target object has been extracted successfully. Each stage progresses in the fashion described before in which the most obvious features are recognized first and then the less obvious ones follow. The stages start from general features, such as the contour of the digits, to more specific features, such as the joint space characterization of the middle phalange of each digit. At each of the stages as well as substages, an interface allows for verification of the found object and, if necessary, correction and refinement of the result data. At this point each of the intermediate target objects attributes and methods are defined. From general to complex, the target objects of segmentation for this specific hand image are as follows: the digit contours, the digit axis, the joint spaces, and the middle phalanges contour. These intermediate target objects are described hereinafter starting with the most general and moving to the most complex or specific.

Figure 4:
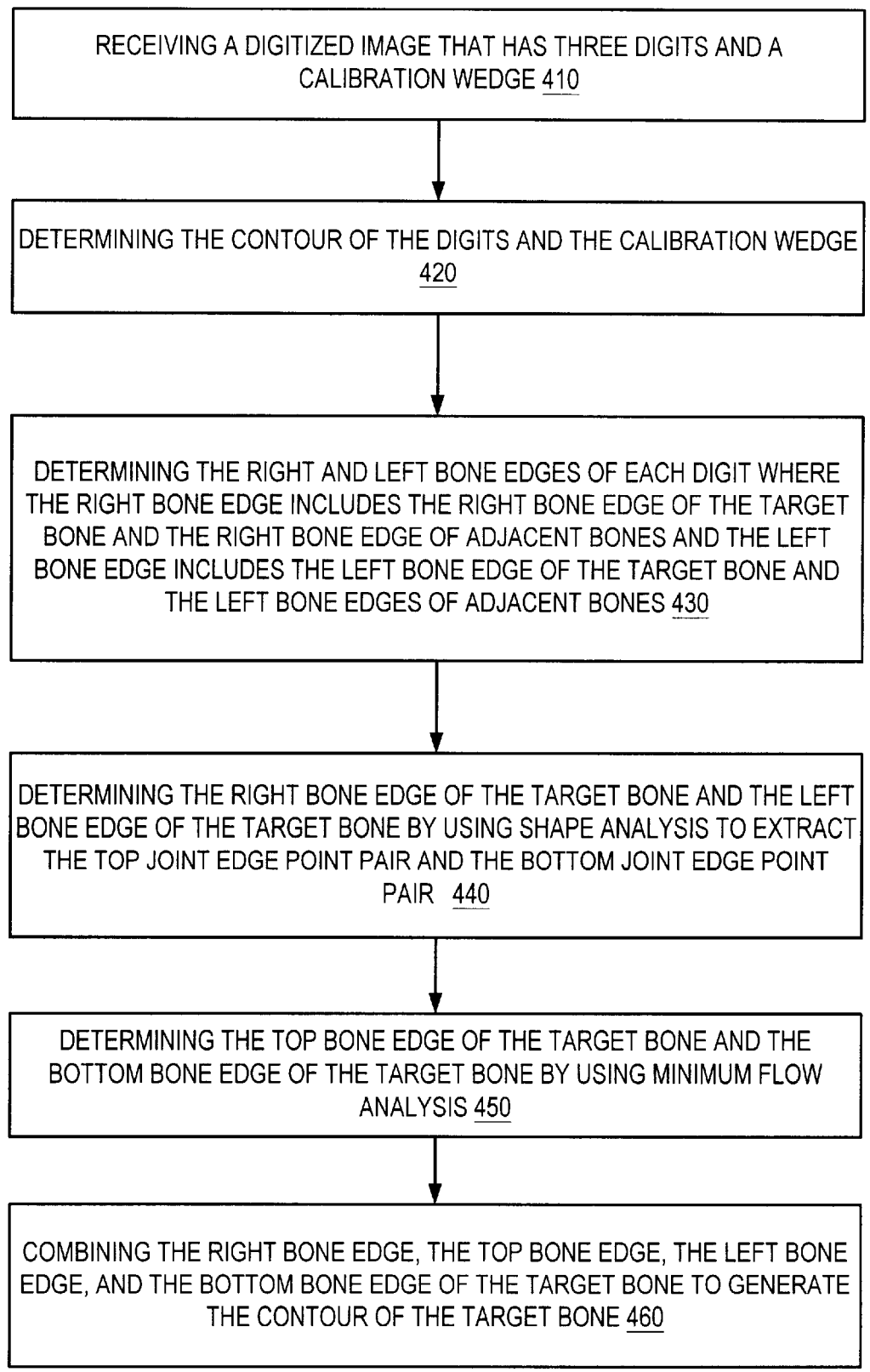
FIG. 4 illustrates the step of an automatic segmentation method according to one embodiment of the present invention.
Figure 8:
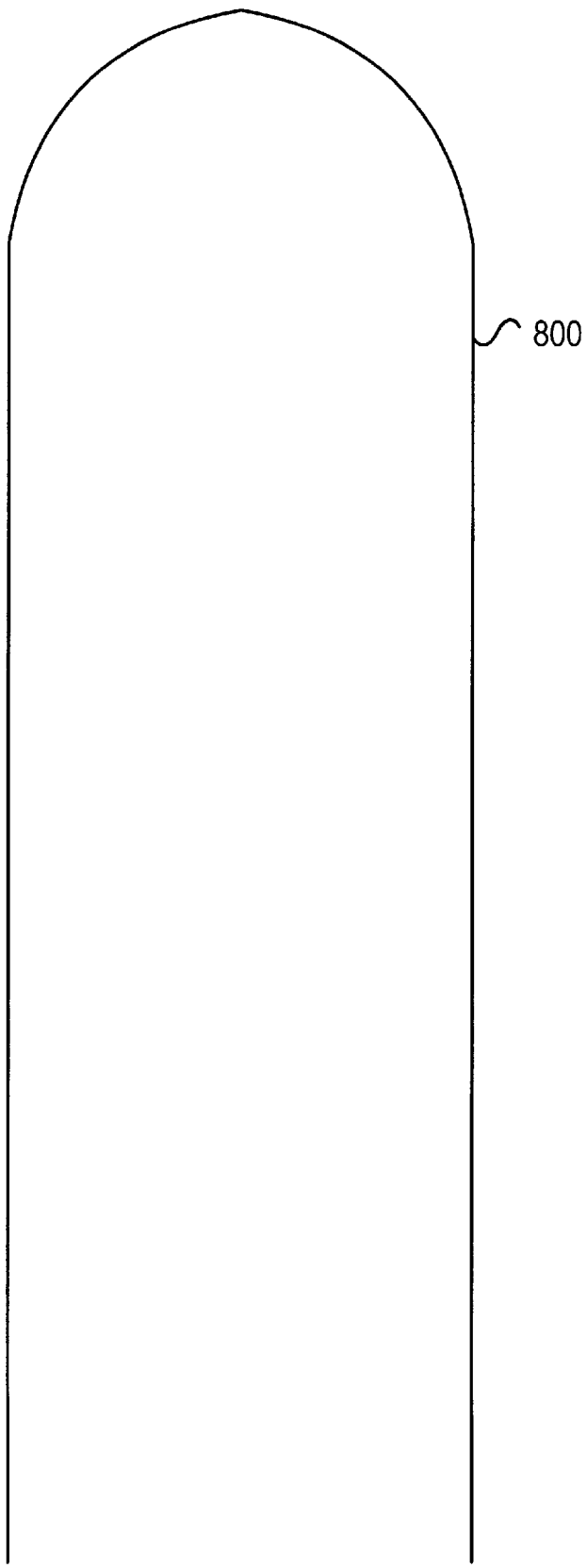
FIG. 8 illustrates an exemplary contour of a digit generated by the present invention.
Figure 10:
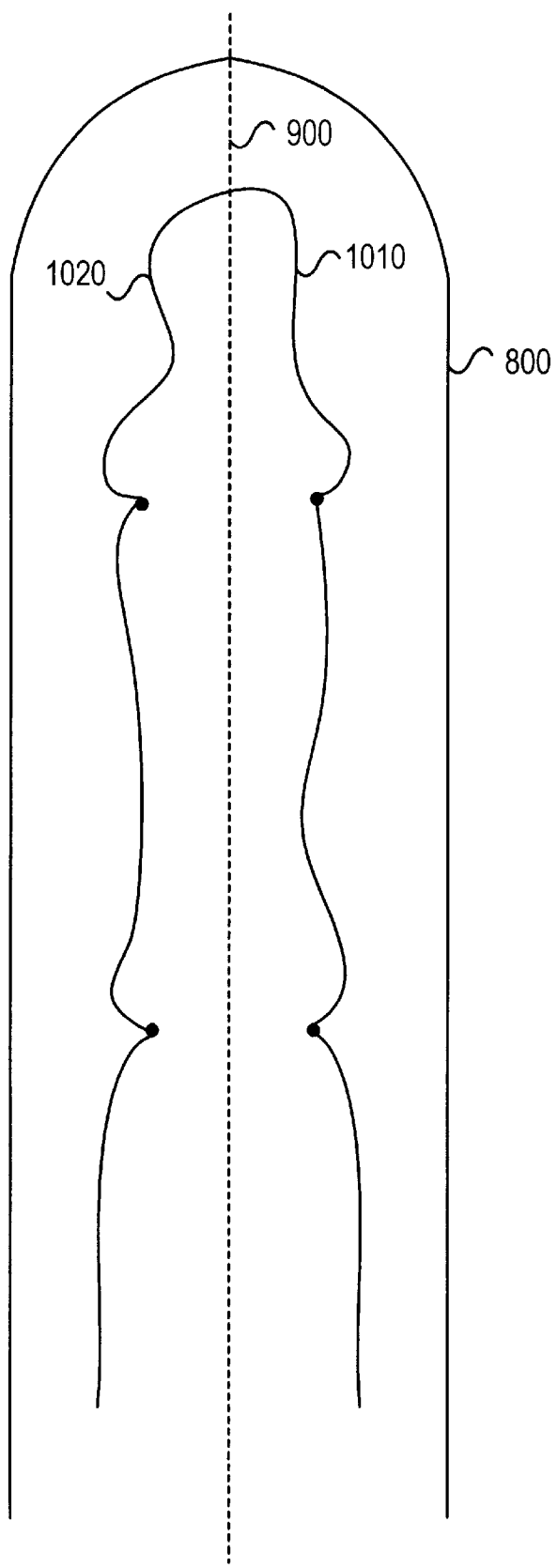
FIG. 10 illustrates an exemplary right bone edge and left bone edge generated by the present invention.

FIG. 4 illustrates the step of an automatic segmentation method according to one embodiment of the present invention. In step 410, ASM 60 performs the step of receiving a digitized image that has three digits and a calibration wedge. In step 420, ASM 60 performs the step of determining the contour of the digits (e.g., digit contour 800 of FIG. 8) and the calibration wedge. In step 430, ASM 60 performs the step of determining the right and left bone edges (e.g., right bone edge 1010 and left bone edge 1020 of FIG. 10) of each digit where the right bone edge includes the right bone edge of the target bone and the right bone edge of adjacent bones and the left bone edge includes the left bone edge of the target bone and the left bone edges of adjacent bones. In this example, the right and left bone edges are for the entire digit and include edges of the distal and proximal phalange.

Figure 11:
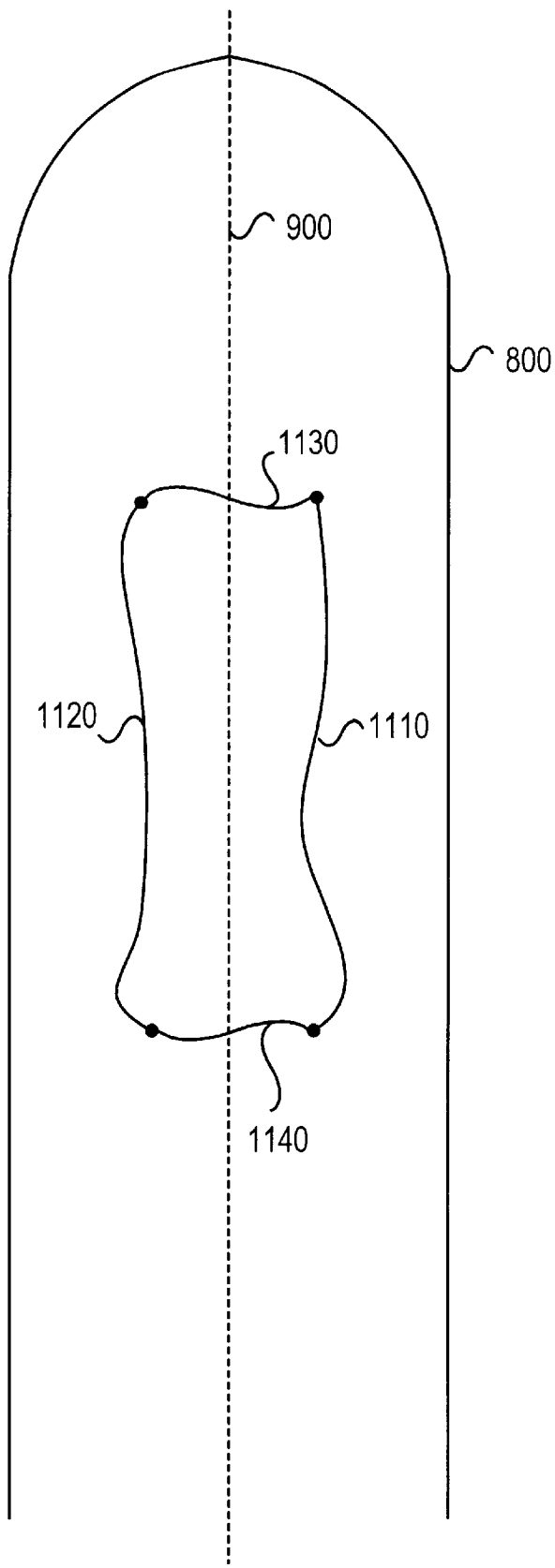
FIG. 11 illustrates an exemplary contour of a target bone generated by the present invention.

In step 440, ASM 60 performs the step of determining the right bone edge of the target bone (e.g., right bone edge 1110 of the middle phalange) and the left bone edge (right bone edge 1120 of the middle phalange of FIG. 11) of the target bone by using shape analysis. As described in greater detail hereinafter, the step of determining the right and left bone edges can include the step of determining the top and bottom joint edge points using shape analysis. In step 450, ASM 60 performs the step of determining the top bone edge (top bone edge 1130 of the middle phalange of FIG. 11) of the target bone and the bottom bone edge (bottom bone edge 1140 of the middle phalange of FIG. 11) of the target bone by using minimum flow analysis. In step 460, ASM 60 performs the step of combining the right bone edge, the top bone edge, the left bone edge, and the bottom bone edge of the target bone to generate the contour of the target bone.

Digit/Wedge Contour Stage

FIG. 5 is a flowchart illustrating in greater detail step 420 of FIG. 4 according to one embodiment of the present invention. In step 500, ASM 60 generates a smoothed image by applying a noise filter (e.g., a low pass filter) to the image. In step 504, ASM 60 generates an edge image based on the smoothed image by using an edge detecting filter (e.g., a Sobel edge detecting filter). In step 508, ASM 60 generates a binarized edge image based on the edge image by performing gray level thresholding on the edge image. In step 520, ASM 60 performs the step of determining the position (e.g., the x position relative to the image) of each of the digits and the calibration wedge by using a vertical profile analysis. In step 530, ASM 60 performs the step of determining a local region (e.g., a rectangular region specified by four corner points) for each digit and the calibration wedge based on the position information.

In step 540, ASM 60 performs the step of determining a local threshold for each local region by performing a local histogram analysis. In step 550, ASM 60 performs the step of binarizing each local region based on the local threshold corresponding for that region. In step 560, ASM 60 performs the step of applying a contour follower (e.g., a bug contour follower) on the binarized image to generate contours for the digits and the wedge.

The main attribute or characteristic that distinguishes the segmentation of a digit/wedge is the sharp increase from background pixel gray-level values to soft-tissue pixel gray-level values or from background pixel gray-level values to wedge pixel gray-level values. In general, background pixels are a result of air being imaged by x-rays. Air as a material corresponds to a very distinct range of gray-level values. A second attribute is that there is a larger occurrence of background pixels than the occurrence of digit/wedge pixels. A third attribute is that the background to soft-tissue/wedge edge is very distinct because of the physical differences between air and soft-tissue or air and wedge, especially on a 2-D projectional radiograph.

This stage attempts to extract the contours of the digits two, three, and four of a special hand image together with the contour of the wedge that is placed to the right edge of the image.

The first step is to localize the region of each target object, due to inhomogenieties within the image such as radiographic shadow and uneven x-ray field source. First, an edge detecting algorithm (e.g., Sobel, Canny, Prewitt, etc.) is applied to the image to enhance the edges of the digits and the wedge. Next, the edge image is normalized so that all edges are extracted.

Then, using a vertical profile analysis, the spatial location (with respect to the entire image) of each digit and wedge is located. Once the spatial region of each digit and the wedge is localized, then the region surrounding each digit and wedge is extracted, and a local histogram is extracted. With each local digit region, a smoothing filter and then a histogram analysis is performed to locate the soft-tissue to background threshold. This is accomplished due to the trimodal character of the hand image. The background pixels in the image correspond to a very distinct peak in the histogram of the image and a threshold can be extracted.

Once the local threshold is generated, a local region is binarized (i.e., soft-tissue and bone is assigned a first predetermined value to represent "white", and the background is assigned a second predetermined value to represent "black"). A bug-follower contour algorithm is performed on the binarized local region to generate a contour of points in the x-y space with respect to the original image for each digit and wedge. These data points (contour) for each digit are stored for the next levels while the wedge contour data points are used for bone density calibration purposes.

Once the contours and axis of each digit and wedge are obtained, the next intermediate level is the determination of the upper and lower joint edge points surrounding the middle phalange. Each digit is treated as a separate object. Although currently, the methods performed on each digit are identical, custom methods and attributes specific to each digit (i.e., the length and the width of digit 3 vs. digit 2) can be easily implemented in the future. The methods described are assumed to be performed on each of the three digits.

At this intermediate level, there are actually a variety of sub-levels of target objects. On the main sub-level, the target object to segment is the left and right bone edges of the distal, middle, and proximal phalanges. The main attributes for extracting the bone edge is the fact that there is a distinct soft-tissue to bone edge. Since the area is now localized to the region between the bone (i.e., the medial axis of the phalange) and the soft-tissue (i.e., the digit contour), the edge can be found for both the right and left side of the digit. Using the right and left side of the bone, there are distinct notches that correspond to the outer joint edge points necessary to anchor the joint space extraction. This attribute is used to extract the outer left and right anchor points of each joint space. Finally, the joint space can be characterized by fact that there is space between bone which corresponds to a lower gray-level pixel value than bone. If the space is very small or fused, there is still the characteristic that the area is surrounded by the cortical ends of two bones. These ends correspond to a very distinct gray-level value. This attribute can be used to find the area in between these two "hot spots".

Once the medial axis has been found, the localized region of the digit is rotated to a vertical position if it was previously angled in the original image. All current methods described will be performed on the rotated localized digit image. A Sobel edge enhancement filter is performed on the localized image. Next, using the medial axis and the contour of the digit as the maximum limit, and edge is extracted at each medial axis point. This is performed for the bone edge to the left of the axis and the bone edge to the right of the axis. A contour of spatial (x,y) points are obtained for the left and right bone edges of the digit. For each bone edge contour, a second derivative is performed to extract the notches in the contour.

These notches correspond to possible joint edge point candidates since they appear as notches on the bone edge contour. A candidate list of notched are extracted from each bone edge contour and a candidate selection process is performed.

The candidate selection process is performed to extract the two true joint edge points of each side of the bone edge contour. This selection process begins by forming specific features that are only characteristic to a joint point on the bone edge contour. These features include spatial, geometric, gray-level texture, and shape characteristics. Each of these features are then weighted and combined to form one total candidate score. Data is then collected for each notch point candidate and then the scores tallied. The two notch points that are selected then become the respective side's upper and lower joint edge points. The opposite bone edge side's joint points are calculated in the same fashion.

Joint Edge Point Candidate Selection

Once the bone outline of a finger is obtained from the previous processing stage, a Joint Point Candidate Selection method (JPCSM) finds the four joint edge points of the middle phalange (herein referred to as MP). The joint edge points are defined as the points on the left bone outline and right bone outline that are located closest to the joint space between the middle phalange and the distal phalange and the joint space between the middle phalange and proximal phalange. As used herein, the term "phalange" means the distal phalange, middle phalange, and the proximal phalange. The term "left bone outline" means the left outline for the phalange (i.e., the left outline of the distal phalange, middle phalange, and the proximal phalange), and the term "right bone outline" means the right outline for the phalange (i.e., the right outline of the distal phalange, middle phalange, and the proximal phalange).

In order to find these joint edge points from the right and left bone outlines, JPCSM searches for narrow intervals in the right and left bone outlines that correspond to dips or notches. Since the joint space is soft tissue area between bones, the bone outlines tend to penetrate inward toward the center of the bone making small dips or notches along the bone edge outlines.

Figure 6:
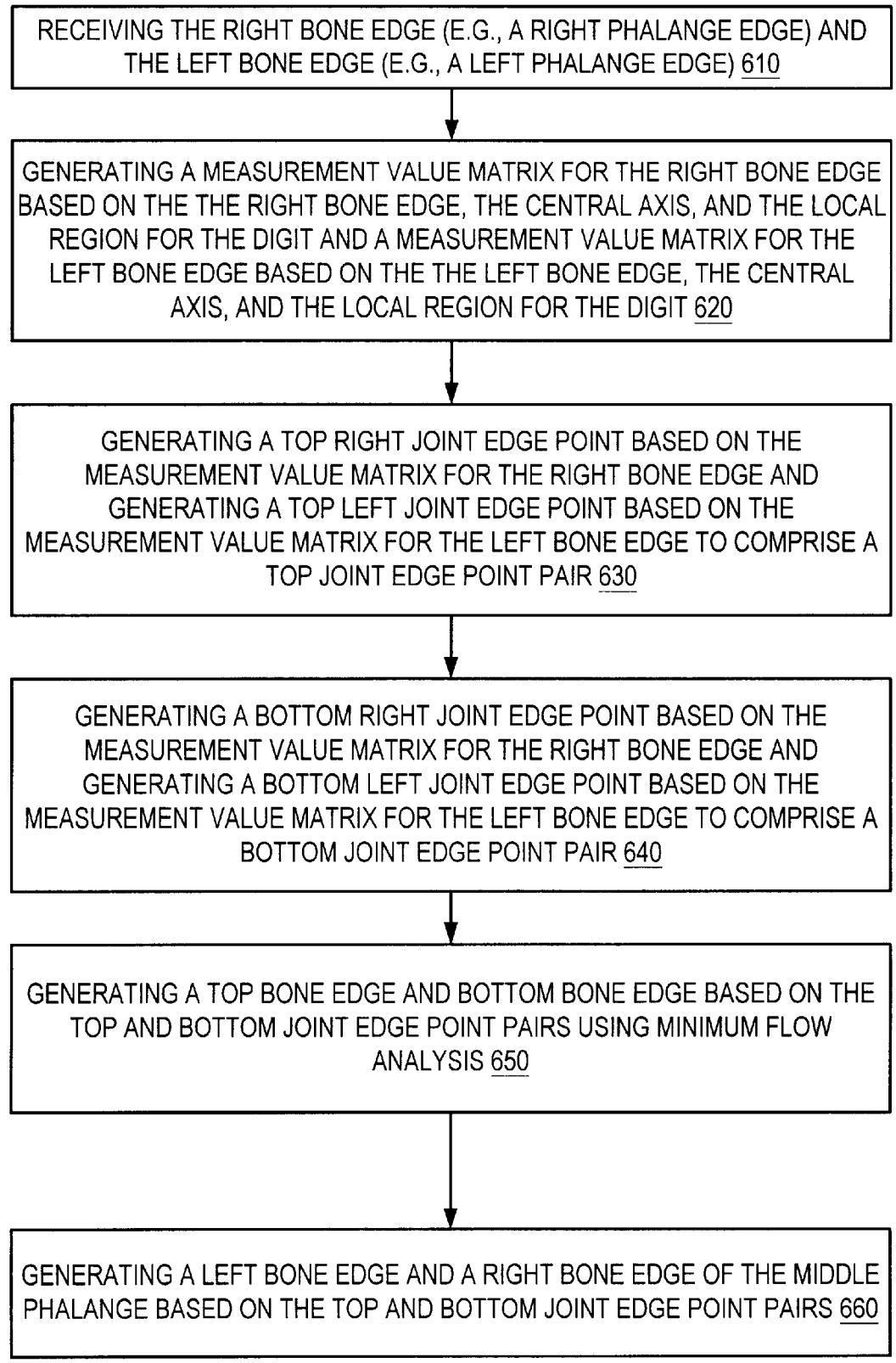
FIG. 6 is a flowchart illustrating in greater detail the step of determining the left and right bone edges of each digit of FIG. 3 according to one embodiment of the present invention.

FIG. 6 is a flowchart illustrating in greater detail step 188 of FIG. 3 according to one embodiment of the present invention. In step 610, ASM 60 performs the step of receiving the right bone edge (e.g., a right phalange edge) and the left bone edge (e.g., a left phalange edge). In step 620, ASM 60 performs the step of generating a measurement value matrix for the right bone edge based on the right bone edge, the central axis, and the local region for the digit and a measurement value matrix for the left bone edge based on the left bone edge, the central axis, and the local region for the digit.

In step 630, ASM 60 performs the step of generating a top right joint edge point based on the measurement value matrix for the right bone edge and generating a top left joint edge point based on the measurement value matrix for the left bone edge to comprise a top joint edge point pair.

In step 640, ASM 60 performs the step of generating a bottom right joint edge point based on the measurement value matrix for the right bone edge and generating a bottom left joint edge point based on the measurement value matrix for the left bone edge to comprise a bottom joint edge point pair.

In step 650, ASM 60 performs the step of generating a top bone edge and a bottom bone edge based on the top and bottom joint point edge pairs using minimum flow analysis.

In step 660, ASM 60 performs the step of generating left and right bone edges of the middle phalanges based on the top and bottom joint edge point pairs.

Figure 7:
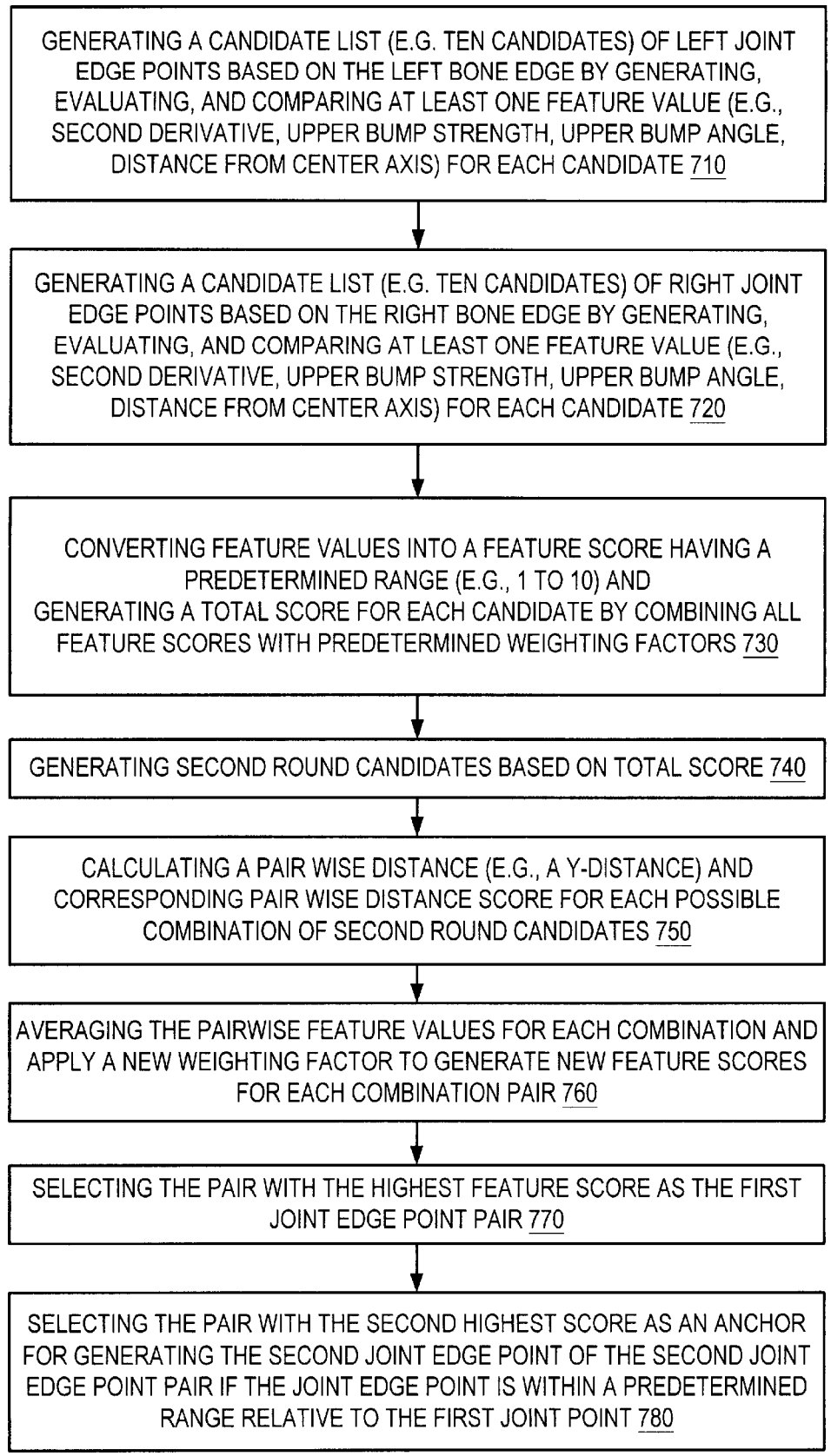
FIG. 7 is a flowchart illustrating in greater detail the steps of determining the top joint edge point pair and the bottom joint edge point pair of FIG. 6 according to one embodiment of the present invention.

FIG. 7 is a flowchart illustrating in greater detail step 640 of FIG. 6 according to one embodiment of the present invention. In step 710, ASM 60 performs the step of generating a candidate list (e.g. ten candidates) of left joint edge points based on the left bone edge by generating, evaluating, and comparing at least one feature value (e.g., second derivative, upper bump strength, upper bump angle, distance from center axis) for each candidate. In step 720, ASM 60 performs the step of generating a candidate list (e.g. ten candidates) of right joint edge points based on the right bone edge by generating, evaluating, and comparing at least one feature value (e.g., second derivative, upper bump strength, upper bump angle, distance from center axis) for each candidate.

In step 730, ASM 60 performs the step of converting feature values into a feature score having a predetermined range (e.g., 1 to 10) and generating a total score for each candidate by combining all feature scores with predetermined weighting factors.

In step 740, ASM 60 performs the step of generating second round candidates based on total score. In step 750, ASM 60 performs the step of calculating a pair wise distance score for each possible combination of second round candidates on the left bone edge and the right bone edge. The pair wise distance is the y distance (i.e., the vertical displacement) between a candidate on the left bone edge and a candidate on the right bone edge. This step can include starting with a first candidate on the left bone edge and determining the y-distance between the first candidate and every possible candidate located on the right bone edge. A corresponding y-distance score can be generating for each y-distance. Then, the y-distance scores for the pairs that include the next candidate on the left bone edge and every possible candidate located on the right bone edge are determined. This process can be repeated until all candidates on the left bone edge are processed.

In step 760, ASM 60 performs the step of averaging the pairwise feature values for each combination and applying a new weighting factor to generate new feature scores for each combination pair. In step 770, ASM 60 performs the step of selecting the pair with the highest feature score as the first joint edge point pair. In step 780, ASM 60 performs the step of selecting the pair with the second highest score as a beginning point for generating the second joint edge point if the joint edge point is within a predetermined range relative to the first joint edge point.

Figure 12:
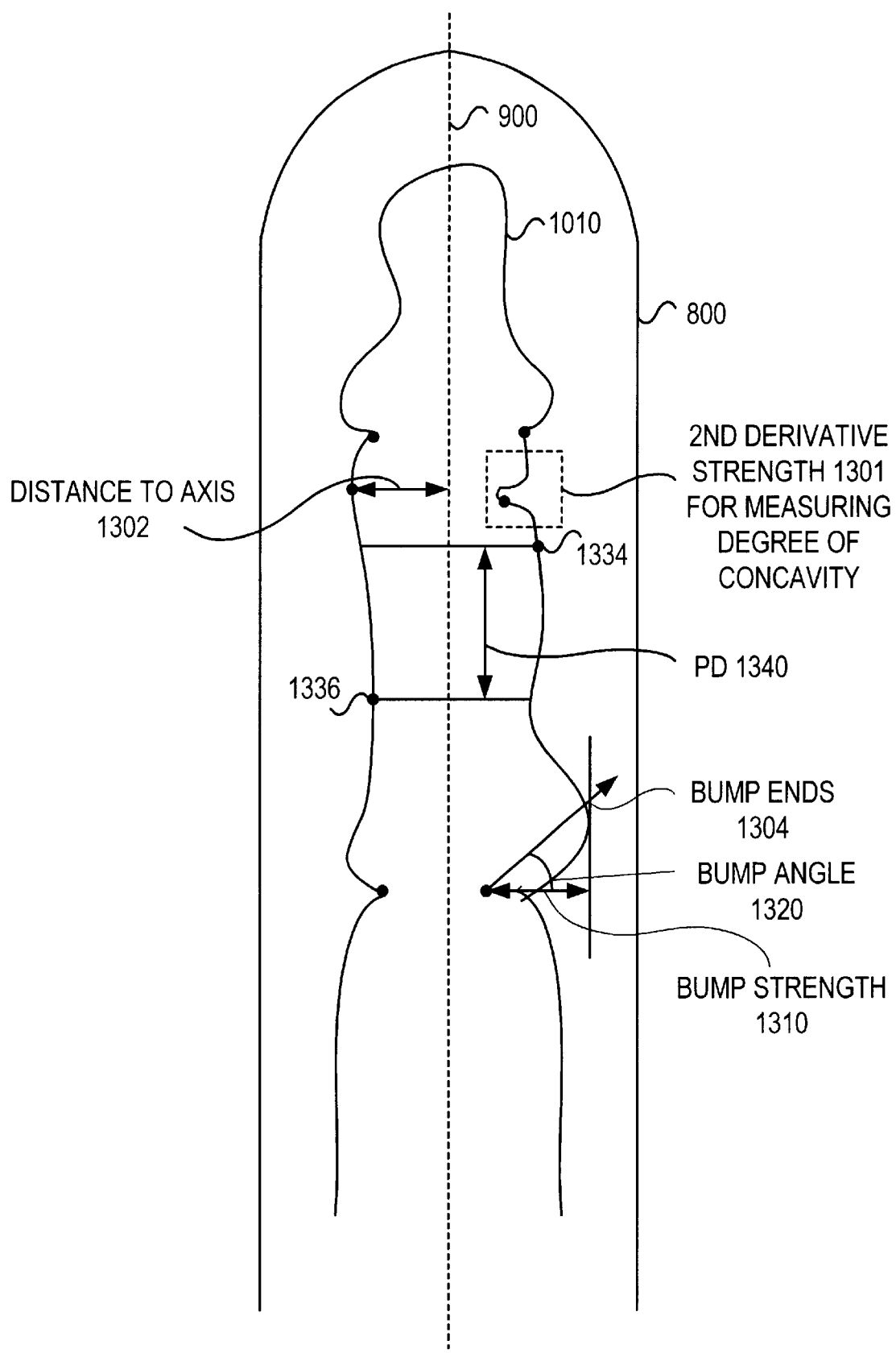
FIG. 12 illustrates features that are used in one embodiment of the present invention to determine the joint edge points.

In one embodiment, the JPCSM of the present invention performs the following steps to determine the joint edge points:

1. JPCSM applies a second derivative mask, which for example can be a 5×1 mask, to the right and left bone outlines in order to find joint point candidates (i.e., points that are dips (or notches)). The second derivative mask is for evaluating second derivative strength, which is a measure of the degree of concavity (e.g., dip 1301 in FIG. 12). Based on the second derivative strength, the JPCSM determines these joint point candidates for the right bone outline and the left bone outline. Then, JPCSM selects a predetermined number, which, for example, can be seven, strongest second derivative magnitude values and stores these points in a candidate list.
2. JPCSM also utilizes other predetermined features or criteria of the joint point candidates in order to evaluate the candidates. These, predetermined features or criteria can include, but are not limited to, second derivative strength, distance to center axis (e.g, distance 1302), the upper bump strength and the upper bump angle values. These features are illustrated in FIG. 13. JPCSM scales each of these features for each of the chosen candidates and records these features into the candidate list. The upper bump (also referred to as bump end) refers to the contour interval found in the upper area from a candidate point. The upper bump (e.g., bump end is a useful signature for finding the joint points since anatomically there are upper bumps in the bone shape which correspond to wide bottom area of the distal and middle phalanges. The upper bump is a point on the contour where the contour begins to go inward (i.e., toward the medial axis) The strength of the upper bump (e.g., strength of upper bump 1310 of FIG. 12) refers to the degree of protrusion outward and the angle of it measures vertical distance between the candidate point and the peak of the bump approximating the correct roundness of the bump as opposed to a distinct artificial spike. The upper bump angle (e.g., upper bump angle 1320 of FIG. 12) corresponds to the angle from the candidate joint point and the position of the maximum bump strength along the vertical axis. JPCSM utilizes the upper bump angle to effectively to detect the presence of noise spikes or false dips that feature a sharp perpendicular angle measurement as an upper bump angle. Once detected, JPCSM discards these noise artifacts.
3. The JPCSM converts the feature values discussed above into a single combined score and uses weighting factors to indicate the relative significance of those features. According to the combined score, the JPCSM selects a predetermined number (e.g., five candidates) of strongest candidates out of the previous seven candidates.
4. The JPCSM then computes the relative distance for all the permutation pairs of the left and right side candidates. In this example, JPCSM computes the relative distance for 25 permutation pairs. The JPCSM then converts these distances (e.g., pairwise distance 1340 between a first joint edge point 1334 on the right bone edge and a second joint edge point 1336 on the left bone edge illustrated in FIG. 12) into scores based on the range of distance values. For example, a distance in the range of 1–3 is assigned a score of 10, a distance in the range of 4–7 is assigned a score of 8, etc.
5. Next, JPCSM constructs a 5×5 matrix whose elements or components are the combined scores of the features, which can include, but is not limited to, second derivative strength, distance to center axis, bump strength, and pairwise distance. JPCSM multiplies a weighting factor to the average of each feature value for the left bone side and right bone side to generate the combined score It is noted that for the pairwise distance feature, the averaging of the left side and right side feature values may not be needed and may not be calculated by JPCSM).
6. JPCSM selects the candidate with the highest combined score calculated and stores the candidate as the pair of left and right outer joint points.
7. JPCSM then selects the most desirable right side candidate for the second pair of the joint points. JPCSM extracts the most desirable right side candidate from one of the seven candidates selected in step (1) that has the maximum combined score computed in step (3) and also located in the proper range relative to the right side candidate point of the first pair computed in the step (6).

Finally, JPCSM selects the left outer joint point by searching the proximity of the previously found right side of the second pair. JPCSM extracts the left outer joint point from one of the seven left side candidates selected in step (1) which is located closest to the right side point of the second pair.

Minimum Flow Analysis

Once the joint points are extracted, they form the anchors for the next stage, which is to characterize the joint space (i.e., to extract the upper and lower bone edges of the middle phalange). The upper and lower bone edges of the middle phalange can be determined by using a minimum flow analysis with a progressive feedback.

In general, the minimum flow algorithm begins at one side of the joint point and proceeds until it reaches the other side near the joint point of the opposite side. The minimum flow analysis is based on determining the path of least resistance. In this case, the path of least resistance is determined to be the joint space which has a lower gray-level value characteristic compared to the high gray-level values of nearby bone. The data points collected are similar to the (x,y) spatial points of the digit contour and bone edges and can be stored for the next stage.

Specifically, minimum Flow Analysis is used to characterize the joint space. This method is especially effective when the joint space is very fine. There are several ways the flow analysis is used. In this segmentation system, both a minimum gray level value is used as the flow parameter as well as an edge value. The flow analysis is based on the concept of a river with bounded by a complex set of riverbanks. The concept of the flow analysis is to follow the flow of the river which flows with the least resistance near the center of the river. In the same way, flow analysis is used to search for the path of least resistance, which, in this case is the minimum gray level value. This minimum gray level value corresponds to joint spacing, assuming bone as lighter or higher gray level values and soft-tissue as darker lower gray level values.

The input points that constrain the length of this river are the outer left and right joint points extracted from the joint point candidate extraction method. The image is based on a single digit rotated to its vertical position. Given the outer joint points, the next step is to define how wide the river will be. In general, a fixed arbitrary width was used since joint spacing does not vary drastically from digit to digit. However, the width is variable and can be easily modified if necessary. Once the width is determined then, a group of pixels transverse the upper and lower boundaries of the fixed area is obtained and evaluated. A pixel is chosen that has the minimum gray-level value. This procedure continues until the method has begun from one side of the outer joint point to the other. Once again, start and end points are variable. Based on the specific joint space or digit, the method can be determined to begin from the left or from the right or from the center moving outwards, or from the outer ends moving towards the center. Each progressive pixel is evaluated with the previous pixel to determine whether the candidate chosen is spatially within the limits defining a continuous or near-continuous curve across the joint space area. This prevents erratic jumps that may occur due to noise, which can be especially prevalent near the center of the joint space.

Another variant is the characterization of the top bone edge of the middle phalange which also shares the same region as the joint space. Instead of searching for the minimum gray-level value, a specific edge is searched for on a pixel-by-pixel basis which is dependent on whether the target object is the upper bone edge segment or the lower bone edge segment of the middle phalange. The end result is a contour of pixels that define the upper and lower bone edge segments of the middle phalanges.

The advantages over the author's previous thesis work is the variability built-in to the design of the method. The original method had an arbitrary width hard-coded as well as uni-directional path of evaluation. The new method adds variability as to the start and ending points of the path of evaluation. Furthermore, the method is modified to search for the bone edge as well as the joint space area.

Middle Phalange Contour Extraction

The characteristic of this target object is that the middle phalange bone edge contour comprises of a left and right bone edge together with an upper and lower joint space. By combining, these four areas together, a bone contour can be extracted for the middle phalange and used to calculate measurements.

Once the joint space contours are extracted, they are used as the upper and lower bounds for the contour segments of both the left and right side of the bone edge contours. These contour segments directly correspond to the left and right sides of the middle phalange bone. All four segments (i.e., upper joint space, right bone edge contour, lower joint space, left bone edge contour) are combined and smoothed to form the Middle Phalange contour comprising of (x,y) spatial points. The results are obtained automatically from all three digits and then are used to calculate bone density measurements.

Semi-Automatic Operator Intervention

Because of the object-oriented design of the segmentation system, operator intervention can easily implemented into the system should the automatic system fail to achieve satisfactory results. For example, an operator can enter two points: one point near the center of each joint space surrounding the middle phalange. Once these points are received, the medial axis and the left and right bone edges can be determined.

Since the system assumes that the user has entered the user's best guess for the joint space, the two points, provided by the user, are used to anchor the minimum flow analysis, and the resulting middle phalange contour is produced.

If the contour still does meet satisfactory conditions, the operator can then proceed to "fine tune" either joint spaces or both of them. The fine tuning process is performed by manually proceeding up or down the axis of the digit and performing a real-time minimum flow analysis and extracting a joint-space contour that best meets the operator's expectations. It is noted that operator intervention is only needed to help the segmentation properly define target features of the object that that the system had failed to adequately define automatically. The actual segmentation is still performed by the system once the target features have been properly defined by the operator. This operator intervention is only performed when the automatic system has exhausted all knowledge and cannot produce accurate results.

In an alternative embodiment, a feedback verification loop can be implemented where each target object is verified to be correct automatically. If the object has errors, then the system localizes the error and suggests alternate or custom methods to correct the errors. With this feedback verification loop, automatic segmentation is enhanced in the system, and operator intervention becomes unnecessary.

Verification of the Segmented Contour

Once the contour of the target bone (e.g., the middle phalange (MP)) has been automatically segmented, a verification module can be activated to confirm the normal shape of the obtained MP contour. For example, in the case of a MP contour, the following abnormalities can result:

1) contour points penetrating in the MP bone (i.e., a portion of the contour appears as a dip inside the bone)

2) contour points protruding out of the MP bone (i.e., a portion of the contour appears as a spike)
3) part of the MP bone contour is cut off (i.e., a portion of the contour appears as if a part of the bone is chopped off)
4) adjacent bones are included in the contour.

Using a technique called, "Psi-s" transform, these abnormalities can be detected and corresponding correction routines can be triggered. The "Psi-s" transform basically decomposes the collection of points into straight and curved line segments. Then, the line segments corresponding to 'TOP', 'BOTTOM', 'LEFT WAIST' and 'RIGHT WAIST' are labeled. The 'TOP' segment is located in the uppermost position and intersects with the central axis of MP and the 'BOTTOM' is defined symmetrically. The 'LEFT WAIST' is the line segment that constitutes the left side of the narrowest interval of the MP contour and the 'RIGHT WAIST' is defined symmetrically.

After labeling of the segments, it is possible to determine if any of the above-noted abnormalities exists in the given MP contour by examining the line segments obtained by the "Psi-s" transform. The abnormalities of the cases (1) and (2) above can be detected by finding the line segment with a very sharp curve. It is important to consider turning direction according to the scan direction of the contour—clockwise or counter-clockwise in these cases. For case (4), a pair of the curved segments that are located in proximity is searched since the pair indicates a position corresponding to a joint space between bones.

In order to detect case (3), the search for round bumps in the upper or lower area of MP is performed. An anatomically correct MP has round bumps both in the upper and the very bottom part of it. If the upper or lower part is missing, these round bumps can not be found. The search for round bumps in the upper or lower area of MP can involve the following processing steps:

1) locate the midpoint of MP in vertical direction
2) search for a round bump between the 'LEFT WAIST' and 'TOP'
3) search for a round bump between the 'RIGHT WAIST' and 'TOP'
4) search for a round bump between the 'LEFT WAIST' and 'BOTTOM'
5) search for a round bump between the 'RIGHT WAIST' and 'BOTTOM'.

Therefore, if both bumps in the upper area are not found, the verification module reports that the upper part of the MP contour is missing. These steps can be repeated to determine if the lower part of the MP contour is missing.

The foregoing description has provided numerous examples of the present invention. It will be appreciated that various modifications and changes may be made thereto without departing from the broader spirit and scope of the invention as set forth in the appended claims.

What is claimed is:

1. A method for automatically determining the contour of a target bone in a digital image of a body extremity comprising:
    a) receiving a digital image of a body extremity that has at least one digit; wherein each digit has at least two bones;
    b) determining a right bone edge that includes a right edge of the target bone and at least a portion of an edge of another bone in the same digit;
    c) determining a left bone edge that includes a left edge of the target bone and at least a portion of an edge of another bone in the same digit;
    d) determining a top joint edge point pair that includes a right top joint edge point disposed on the right bone edge and a left top joint edge point disposed on the left bone edge;
    e) determining a bottom joint edge point pair that includes a right bottom joint edge point disposed on the right bone edge and a left bottom joint edge point disposed on the left bone edge; and
    f) using the top joint edge point pair and the bottom joint edge point pair to determine the contour of the target bone.

2. The method of claim 1 wherein using the top joint edge point pair and the bottom joint edge point pair to determine the contour of the target bone further includes
    a) generating the top contour of the target bone and the bottom contour of the target bone based on the top joint edge point pair and the bottom joint edge point pair by using minimum flow analysis.

3. The method of claim 1 wherein the step of determining a top joint edge point pair that includes a right top joint edge point disposed on the right bone edge and a left top joint edge point disposed on the left bone edge includes
    generating at least one measurement value matrix for the right top joint edge point based on at least one feature of the right bone edge;
    generating at least one measurement value matrix for the left top joint edge point based on at least one feature of the left bone edge
    wherein determining a bottom joint edge point pair that includes a right bottom joint edge point disposed on the right bone edge and a left bottom joint edge point disposed on the left bone edge includes
        generating at least one measurement value matrix for the right bottom joint edge point based on at least one feature of the right bone edge;
        generating at least one measurement value matrix for the left bottom joint edge point based on at least one feature of the left bone edge.

4. The method of claim 3 wherein the feature can be one of spatial characteristics, geometric characteristics, gray-level characteristics, texture characteristics, shape characteristics, degree of concavity, predetermined criteria for joint point candidates, second derivative strength, distance to center axis, upper bump strength, and upper bump angle.

5. The method of claim 1 further comprising the step of determining the contour of at least one digit; wherein determining the contour of at least one digit includes
    a) generating a binarized edge image;
    b) generating a digit position based on the binarized edge image by utilizing a vertical profile analysis;
    c) generating a local region for the digit based on the digit position;
    d) generating a threshold gray level for the digit by using local histogram analysis;
    e) generating a binarized local image for the digit based on the local region and the threshold gray level; and
    f) generating a digit contour based on the binarized local image.

6. The method of claim 5 wherein the step generating a binarized edge image includes
    a) generating a smoothed image by applying a low pass filter to the image;
    b) generating an edge image based on the smoothed image by using an edge detecting filter; and c) generating the binarized edge image by performing a gray level value thresholding on the edge image.

7. The method of claim 1 further comprising utilizing the target bone contour to determine the average density of the region defined by the target bone contour.

8. The method of claim 1 wherein the contour of the target bone includes a top edge, a bottom edge, a left edge and a right edge;

wherein the step of using the top joint edge point pair and the bottom joint edge point pair to determine the contour of the target bone includes using the left top joint edge point and the left bottom joint edge point to determine the left edge of the target bone;

using the right top joint edge point and the right bottom joint edge point to determine the right edge of the target bone;

using the left top joint edge point and the right top joint edge point to determine the top edge of the target bone; and using the left bottom joint edge point and the right bottom joint edge point to determine the bottom edge of the target bone.

9. A method for automatically determining the contour of a target bone in a digital image of a body extremity comprising:

a) receiving a digital image of a body extremity that has at least one digit; wherein each digit has at least two bones;

b) determining a right bone edge that includes a right edge of the target bone and at least a portion of an edge of another bone in the same digit;

c) determining a left bone edge that includes a left edge of the target bone and at least a portion of an edge of another bone in the same digit;

d) employing shape analysis to determine a top joint edge point pair that includes a right top joint edge point disposed on the right bone edge and a left top joint edge point disposed on the left bone edge;

e) employing shape analysis to determine a bottom joint edge point pair that includes a right bottom joint edge point disposed on the right bone edge and a left bottom joint edge point disposed on the left bone edge; and f) using the top joint edge point pair and the bottom joint edge point pair to determine the contour of the target bone.

10. The method of claim 9 wherein determining a top joint edge point pair that includes a right top joint edge point disposed on the right bone edge and a left top joint edge point disposed on the left bone edge includes prompting a user to specify one of the right top, joint edge point disposed on the right bone edge and the left top joint edge point disposed on the left bone edge;

wherein determining a bottom joint edge point pair that includes a right bottom joint edge point disposed on the right bone edge and a left bottom joint edge point disposed on the left bone edge includes prompting a user to specify one of the right bottom joint edge point disposed on the right bone edge and the left bottom joint edge point disposed on the left bone edge.

11. The method of claim 9 wherein the step of employing shape analysis to determine a top joint edge point pair that includes a right top joint edge point disposed on the right bone edge and a left top joint edge point disposed on the left bone edge includes the steps of generating a list of candidate joint edge points; and employing a candidate selection process to determine the top joint edge point pair; and wherein the step of employing shape analysis to determine a bottom joint edge point pair that includes a right bottom joint edge point disposed on the right bone edge and a left bottom joint edge point disposed on the left bone edge includes the steps of generating a list of candidate joint edge points; and employing a candidate selection process to determine the bottom joint edge point pair.

12. An article of manufacture comprising a program storage medium having computer readable program code means embodied therein for automatically determining the contours of a target bone in a digital image of a body extremity, the computer readable program code means in said article of manufacture including:

a) computer readable program code for causing a computer to receive a digital image of a body extremity that has at least one digit; wherein each digit has at least two bones;

b) computer readable program code for causing a computer to determine a right bone edge that includes a right edge of the target bone and at least a portion of an edge of another bone in the same digit;

c) computer readable program code for causing a computer to determine a left bone edge that includes a left edge of the target bone and at least a portion of an edge of another bone in the same digit;

d) computer readable program code for causing a computer to determine a top joint edge point pair that includes a right top joint edge point disposed on the right bone edge and a left top joint edge point disposed on the left bone edge;

e) computer readable program code for causing a computer to determine a bottom joint edge point pair that includes a right bottom joint edge point disposed on the right bone edge and a left bottom joint edge point disposed on the left bone edge; and f) computer readable program code for causing a computer to use the top joint edge point pair and the bottom joint edge point pair to determine the contour of the target bone.

13. The article of manufacture of claim 12 further comprising:

a) computer readable program code for causing a computer to generate the left target bone contour and the right target bone contour based on the top joint edge point pair and the bottom joint edge point pair.

14. The article of manufacture of claim 12 further comprising:

a) computer readable program code for causing a computer to generate the top target bone contour and the bottom target bone contour based on the top joint edge point pair and the bottom joint edge point pair by using minimum flow analysis.

15. The article of manufacture of claim 12 further comprising:

a) computer readable program code for causing a computer to generate at least one measurement value matrix for the right top joint edge point based on at least one feature of the right bone edge;

b) computer readable program code for causing a computer to generate at least one measurement value matrix for the left top joint edge point based on at least one feature of the left bone edge;

c) computer readable program code for causing a computer to generate at least one measurement value matrix for the right bottom joint edge point based on at least one feature of the right bone edge; and d) computer readable program code for causing a computer to generate at least one measurement value matrix for the left bottom joint edge point based on at least one feature of the left bone edge.

16. The article of manufacture of claim 15 wherein the feature can be one of spatial characteristics, geometric characteristics, gray-level characteristics, texture characteristics, shape characteristics, degree of concavity, predetermined criteria for joint point candidates, second derivative strength, distance to center axis, upper bump strength, and upper bump angle.

17. The article of manufacture of claim 12 further comprising:

a) computer readable program code for causing a computer to generate a binarized edge image;

b) computer readable program code for causing a computer to generate a digit position based on the binarized edge image by utilizing a vertical profile analysis;

c) computer readable program code for causing a computer to generate a local region for the digit based on the digit position;

d) computer readable program code for causing a computer to generate a threshold gray level for the digit by using local histogram analysis;

e) computer readable program code for causing a computer to generate a binarized local image for the digit based on the local region and the threshold gray level; and f) computer readable program code for causing a computer to generate a digit contour based on the binarized local image.

18. The article of manufacture of claim 17 further comprising:

a) computer readable program code for causing a computer to generate a smoothed image by applying a low pass filter to the image;

b) computer readable program code for causing a computer to generate an edge image based on the smoothed image by using an edge detecting filter; and c) computer readable program code for causing a computer to generate the binarized edge image by performing a gray level value thresholding on the edge image.

19. The article of manufacture of claim 12 further comprising:

a) computer readable program code for causing a computer to prompt a user to specify one of the a right top joint edge point disposed on the right bone edge, a left top joint edge point disposed on the left bone edge, a right bottom joint edge point disposed on the right bone edge, and a left bottom joint edge point disposed on the left bone edge.

* * * * *